United States Patent
Breeden

(10) Patent No.: US 11,995,716 B2
(45) Date of Patent: May 28, 2024

(54) CLASSICAL AND QUANTUM COMPUTING METHODS FOR PRICING FOR ACCOUNT-LEVEL UNCERTAINTY

(71) Applicant: DEEP FUTURE ANALYTICS, LLC, Santa Fe, NM (US)

(72) Inventor: Joseph L. Breeden, Santa Fe, NM (US)

(73) Assignee: DEEP FUTURE ANALYTICS, LLC, Santa Fe, NM (US)

( * ) Notice: Subject to any disclaimer, the term of this patent is extended or adjusted under 35 U.S.C. 154(b) by 0 days.

(21) Appl. No.: 17/553,263

(22) Filed: Dec. 16, 2021

(65) Prior Publication Data
US 2023/0196452 A1    Jun. 22, 2023

(51) Int. Cl.
  *G06Q 40/03* (2023.01)
  *G06N 7/01* (2023.01)
  *G06N 10/60* (2022.01)

(52) U.S. Cl.
  CPC ............... *G06Q 40/03* (2023.01); *G06N 7/01* (2023.01); *G06N 10/60* (2022.01)

(58) Field of Classification Search
  CPC ........... G06Q 40/03; G06N 10/60; G06N 7/01
  See application file for complete search history.

(56) References Cited

U.S. PATENT DOCUMENTS

| | | | |
|---|---|---|---|
| 7,933,796 B1* | 4/2011 | Buist, III | G06Q 40/03 705/36 R |
| 2012/0023006 A1* | 1/2012 | Roser | G06Q 40/03 706/12 |

OTHER PUBLICATIONS

An, M. Y. (1998). Logconcavity versus logconvexity: a complete characterization. Journal of economic theory, 80(2):350-369.

Asmussen, S. and Lehtomaa, J. (2017). Distinguishing log-concavity from heavy tails. Risks, 5(1):10.

Binder, K. and Stauffer, D. (1984). A simple introduction to monte carlo simulation and some specialized topics. In Binder, K., editor, Applications of the Monte Carlo Method in Statistical Physics. Springer-Verlag, New York.

Brassard, G., Hoyer, P., Mosca, M., and Tapp, A. (2002). Quantum amplitude amplification and estimation. Contemporary Mathematics, 305:53-74.

Breeden, J. L. and Crook, J. (2020). Multihorizon discrete time survival models. Journal of the Operational Research Society, pp. 1-14.

Breeden, J. L. and Liang, S. (2015). A mean-reverting model to create macroeconomic scenarios for credit risk models. Journal of Risk Model Validation, 9(4):1-12.

Egger, D. J., Gutierrez, R. G., Mestre, J. C., and Woerner, S. (2020). Credit risk analysis using quantum computers. IEEE Transactions on Computers.

FASB (2012). Financial Instruments Credit Losses (Subtopic 825-15). Financial Accounting Series.

(Continued)

*Primary Examiner* — Bennett M Sigmond
*Assistant Examiner* — Marla Hudson
(74) *Attorney, Agent, or Firm* — Clark Hill PLC; John S. Paniaguas

(57) ABSTRACT

A Monte Carlo simulation is disclosed to propagate model estimate and macroeconomic uncertainties through the calculation of lifetime loss or yield and their uncertainties using a classical computer or a quantum for the purposes of adjusting loan pricing for the uncertainty in the yield.

8 Claims, 2 Drawing Sheets

(56) References Cited

OTHER PUBLICATIONS

Glasserman, P., Heidelberger, P., and Shahabuddin, P. (2000). Efficient Monte Carlo methods for value-at-risk. IBM Thomas J. Watson Research Division.
Grover, L. and Rudolph, T. (2002). Creating superpositions that correspond to efficiently integrable probability distributions. arXiv preprint quant-ph/0208112.
Gupta, R. C. and Balakrishnan, N. (2012). Log-concavity and monotonicity of hazard and reversed hazard functions of univariate and multivariate skew-normal distributions. Metrika, 75(2):181-191.
IASB (2014). IFRS 9 financial instruments. Technical report, IFRS Foundation.
Jaeckel, P. (2002). Monte Carlo methods in finance. John Wiley and Sons.
Montanaro, A. (2015). Quantum speedup of monte carlo methods. Proceedings of the Royal Society A: Mathematical, Physical and Engineering Sciences, 471(2181):20150301.
Uhlenbeck, G. E. and Ornstein, L. S. (1930). On the theory of brownian motion. Physical Review, 38:823-841.

* cited by examiner

CLASSICAL AND QUANTUM COMPUTING METHODS FOR PRICING FOR ACCOUNT-LEVEL UNCERTAINTY

BACKGROUND OF THE INVENTION

1. Field of the Invention

The present invention relates to creating estimating the uncertainty in a prediction of lifetime yield for a loan given the loan pricing parameters. The uncertainty is obtained from considering the model uncertainty when making a prediction considering the input characteristics of a specific loan applicant and the inherent uncertainties in the economy. This problem has not been previously solved in a way that allows for real-time loan decisioning. The present invention involves discovering a computationally efficient way to accomplish this with classical computers and an even-faster way to perform the calculations with quantum computers.

2. Description of the Prior Art

All lenders create portfolio-level estimates of uncertainty that is captured in their stress testing and economic capital models. Those models do not propagate the model estimation and macroeconomic uncertainties for individual accounts to be useful for individual account decisioning.

Further, creating account-level estimates of yield should be the essence of credit scoring. The creation of credit score models can produce confidence intervals on the coefficients and forecast intervals for a specific prediction. However, those models cover only a snapshot of time, e.g., 24 months, or a single time step in the forecast. The forecast uncertainties are not combined across multiple time steps and with macroeconomic uncertainty to produce the account-level estimates of yield and the uncertainty in the yield.

Without understanding the uncertainty in the yield, accounts with very different uncertainties would incorrectly be offered the same pricing.

SUMMARY OF THE INVENTION

The present invention relates to estimating the uncertainty in a prediction of lifetime yield for an individual loan given the loan pricing parameters and credit risk input data. The uncertainty is obtained from considering the model uncertainty when making a prediction considering the input characteristics of a specific loan applicant and the inherent uncertainties in the economy. This problem has not been previously solved in a way that allows for real-time loan decisioning, because incorporating all of the uncertainties in a multi-time step problem (up to 360 months for typical mortgages) has previously been too complex and computationally intensive. The present invention involves properly incorporating the uncertainties of all relevant account-level risk factors into an estimate of lifetime yield uncertainty and discovering a computationally efficient way to accomplish this with classical computers and an even-faster way to perform the calculations with quantum computers.

DESCRIPTION OF THE DRAWING

These and other advantages of the present invention will be readily understood with reference to the following specification and attached drawing wherein.

DETAILED DESCRIPTION

Loan applicants can vary widely in their uncertainty. Two consumers with equivalent bureau scores could have very different performance uncertainties because of differences in the breadth and length of history available and the unique combination of their credit risk attributes.

Creating a lifetime forecast of anything that incorporates macroeconomic scenarios necessarily means that each time step will have a separate forecast with its own prediction interval, prediction intervals being a combination of the confidence intervals of the model coefficients and the error in the fit to the historic data. If the focus is on predicting the probability of default (PD), then the prediction interval about the forecast will not be normally distributed. Combining that with the complication of using a competing risks approach where the probability of attrition (pay-off) is simultaneously predicted means that error propagation cannot have a closed form solution, nor have a matrix algebraic solution that can be applied to discretized distributions.

The present invention performs all of these calculations for any individual account for which a cash flow model is available that predicts the probability of default and probability of pay-off (a.k.a. attrition) at each time step. Monte Carlo simulation, either via classical computation or via quantum Monte Carlo, samples from the forecast distributions in order to tabulate the final lifetime loss and yield distributions, but accelerated by having a parameterized approximation of the shape of the distribution. In the case of quantum Monte Carlo, the process is further accelerated using calculations on the distributions.

Figure 1:
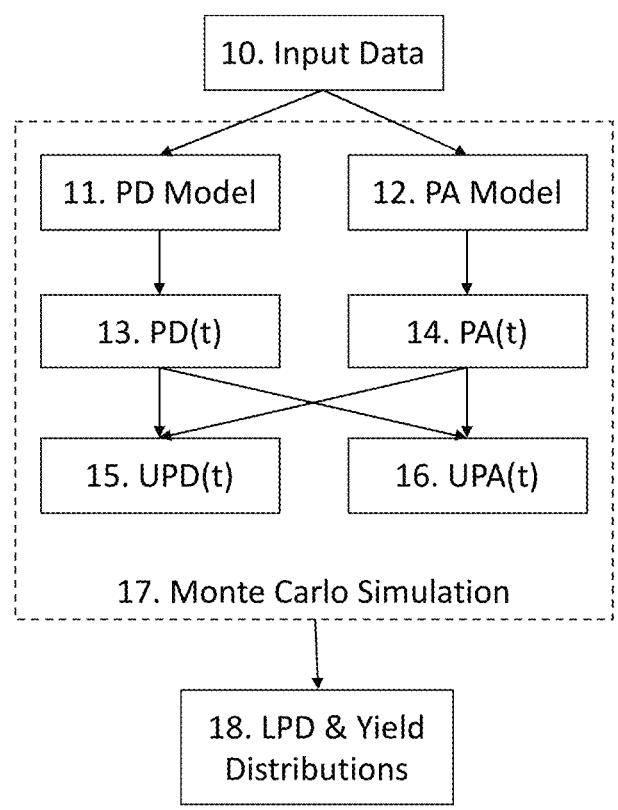
FIG. 1 shows a high-level schematic of the invention.

FIG. 1 provides an illustration of the process. At each timestep t from 1 to the end of the life of the loan, multiple Monte Carlo simulations are performed. For each simulation, input data (10) for the account and economic environment is fed into the PD and PA models (11 and 12) to obtain the distributions of possible values of PD and PA at that time step for that account. In classical Monte Carlo, those distributions are sampled to obtain possible values of PD(t) and PA(t) (13 and 14). The samples of possible values for each time step t are combined to get the unconditional probabilities of default and attrition, UPD(t) and UPA(t) (15 and 16).

This Monte Carlo sampling process is continued many times to create the distribution of lifetime probability of default and lifetime yield (18). By first running test cases, the shape of the distributions for LPD and Yield can be known in advance, so the Monte Carlo samples need only provide enough samples to estimate the parameters of the known distributions. This process produces distributions of LPD and Yield (18) from which the uncertainties may be measured for a given confidence interval.

This reduces the processing time for a single account from tens of minutes to second. To make a loan decision of adjust loan pricing, the calculation must be done in seconds. This is the primary reason that forecast uncertainty was not previously used in loan origination. This invention is fast enough to make this possible.

With quantum computing, we can follow the same procedure as in FIG. 1, but with the samples fed into a quantum Monte Carlo algorithm designed to efficiently measure a specific point on the distributions for LPD and Yield quicker than measuring the entire distribution. This allows the loan decisioning to be even faster.

Monte Carlo simulation, drawing random samples from starting distributions and propagating them through all of the uncertainties, is the best available solution to create the final distribution, for example, as disclosed in Binder and Stauffer (1984); Glasserman et al. (2000); Jaeckel (2002).

The present invention employs this approach to create an account-level risk distribution via either classical or quantum computation. At each time step, the probability of default or attrite is drawn from their respective distributions at that time step and combined with all other time steps in order to gradually tabulate the final distribution.

The present invention can be applied to any cash flow model that periodically predicts revenue and/or loss through the life of a loan. Monthly and quarterly periods are most common. The cash flow model M should take a set of inputs $X_i$ describing the loan attributes for account i in order to adjust the credit risk. The environment may be described with an economic impacts factor $E(t) \pm \Delta E(t)$. At each time step t a forecast is generated $y(t) \pm \Delta y(t) = M(X, E(t) \pm \Delta E(t))$ with forecasting uncertainty $\Delta y(t)$. This expression assumes that the distribution is normally distributed in log-odds of defaults or prepayment, which is known as a logit-normal distribution. Other distributions for the prediction y(t) are also possible.

For the Monte Carlo simulation, the conditional probabilities of default and attrition, PD(a, t) and PA(a, t), are randomly sampled from their respective distributions created by models $M_D(X, E(t) \pm \Delta E(t))$ and $M_A(X, E(t) \pm \Delta E(t))$. These samples from the models are for a single point in time. The goal is to get a lifetime loss or profitability distribution across all of the timesteps of the loan term. If the models are conditional on the number of accounts open at the previous time step, then the unconditional probabilities UPD(a, t) and UPA(a, t) are computed as:

$$UPD(t=t_0+h)=PD(t)\Pi_{i=1}^{h-1}(1-PD(t_0+i)-PA(t_0+i)) \quad \text{Equation 1}$$

$$UPA(t=t_0+h)=PA(t)\Pi_{i=1}^{h-1}(1-PD(t_0+i)-PA(t_0+i)) \quad \text{Equation 2}$$

where $t_0$ is the last month of the history.

The final step of the analysis is to compute the lifetime probability of default LPD or attrition LPA as $$LPD = \sum_{h=1}^{N} UPD(t = t_0 + h)$$

$$LPA = \sum_{h=1}^{N} UPA(t = t_0 + h)$$

LPD and LPA represent samples from the distributions possible life-time probabilities, where lifetime is defined as N steps into the future. To understand the shape of the distributions, we need to propagate the model distributions through the all steps of the calculation of UPD and accumulation to LPD.

The Monte Carlo simulation samples these models many times in order to create tabulated distributions for LPD and LPA. Including basic equations for the revenue and profitability of the product also provides distributions for the lifetime yield for the individual account. All of this can be computed at the point of origination so that the price can be optimized. The pricing can be set so that the loan remains profitable up to a chosen confidence interval, such as 95%.

Performing these simulations on real examples who that the final loss and yield distributions can be closely approximated by lognormal and normalized inverse gaussian distributions, respectively. In an application example, if a close approximation is found, then the Monte Carlo simulation only needs to be run enough times to estimate the parameters of the distribution. This can simplify the problem from requiring on the order of 10,000 simulations to only on the order of 50 simulations, thus making the computations fast enough for real-time loan decisioning.

Specific Example #1: Classical Computing Solution

As an example of this approach, competing risk cash flow models are developed following the multihorizon survival method set forth in Breeden and Crook (2020) for probability of default (PD) and the probability of pay-off, i.e. attrition, on publicly available Freddie Mac mortgage data. This is not the only modeling approach one could use, but serves only as an example.

The first step in creating multihorizon survival models is to run an Age-Period-Cohort (APC) analysis on the data APC models aggregate the account performance data by vintage and calendar date to perform a panel model estimation of the following model:

$$p(a,v,t) \sim F(a) + G(v) + E(t), \text{ where } a=t-v.$$

This creates estimates of lifecycle versus age of the account, F(a), the environment versus calendar date, E(t), and the credit quality versus vintage origination date, G(v).

The second step in creating the multihorizon survival model is to replace the function G(v) with an estimate the coefficients for credit risk factors for each forecast horizon with F(a) and E(t) as fixed inputs. In statistics, a "fixed input" to a regression equation is a factor that has a coefficient=1, so in the following equation, there is no estimation coefficient for the lifecycle and environment that are estimated via APC.

$$p(i, a, v, t_0, h) \sim F(a) + E(t_0 + h) + \sum_{j=1}^{n} c_{jh} * s_{ij}$$

In this expression, the prediction is for account i using n scoring factors $s_{ij}$ for that account. In this example as applied to estimating lifetime yield for mortgage lending, the scoring factors are FICO score, loan-to-value (LTV), loan purpose, and debt-to-income. The model coefficients $c_{jh}$ set the weights for the scoring factors differently for each forecast horizon h. Horizon refers to the number of months into the future from the end of history, $t_0$.

In developing the models, care is used to measure all confidence intervals for all model components. Specifically, we need to know the uncertainty at each point in the lifecycle $F(a) \pm \Delta F(a)$ and the scoring coefficients, $c_{jh} \pm \Delta c_{jh}$.

The future environment and its uncertainty $E(t_0+h) \pm \Delta E(t_0+h)$ is simulated with a second-order Ornstein-Uhlenbeck process, as set forth in Breeden and Liang (2015); Uhlenbeck and Ornstein (1930), like can be done for an economic capital calculation or lifetime loss reserves under IFRS 9 Stage 2 IASB (2014) or FASB's Current Expected Credit Loss (CECL) FASB (2012).

The third step is to estimate the parameters of the Ornstein-Uhlenbeck process from the historic values of the environment function from the APC analysis E(t). The Ornstein-Uhlenbeck process provides a full distribution of possible values at each time step so that the uncertainty $\Delta E(t)$ is the needed width of the distribution at time t.

Several sample accounts with diverse attributes were selected as test cases to be simulated classically via Monte Carlo simulation. The forecast begins on a snapshot date t0. Using information available for account i at $t_0$, we construct conditional distributions of the probability of default or attrition at each time $t=t_0+h$ where h is the forecast horizon.

$$\Delta PD(i,a,t_0,h)^2 \sim \Delta F(a)^2 + \Delta \hat{E}(t_0+h)^2 + \Delta f(i,h)$$

where $\Delta f(i, h)$ is the confidence interval from the scoring forecast $$f(i, h) = \sum_{j=1}^{n} c_{jh} * s_{ij}$$

In units of log-odds, all of the multihorizon survival model coefficients represent the mean of a normal distribution of the possible values for those coefficients. The values for the future environment, $\hat{E}(t_0+h) \pm \Delta \hat{E}(t_0+h)$, generated from the Ornstein-Uhlenbeck process are approximately normally distributed. The conditional probability density functions for PD(t) and PA(t) can be represented as logit-normal distributions. However, combining the distributions for PD(t) and PA(t) at each time step to get to UPD(t) and eventually LPD results in a distribution that does not have a closed form solution.

To create the distributions for LPD and yield, an outer loop is used that samples from the logit normal distributions for PD(i, a, $t_0$, h)$\pm \Delta$PD(i, a, $t_0$, h) and PA(i, a, $t_0$, h)$\pm \Delta$PA(i, a, $t_0$, h). The samples $\widehat{PD}$ (i, a, $t_0$, h) and $\widehat{PA}$ (i, a, $t_0$, h) are combined to get to samples of $\overline{UPD}$ (t) and $\overline{UPA}$ (t). The $\overline{UPD}$ (t) are then summed to get a sample of $\overline{LPD}$.

Figure 2:
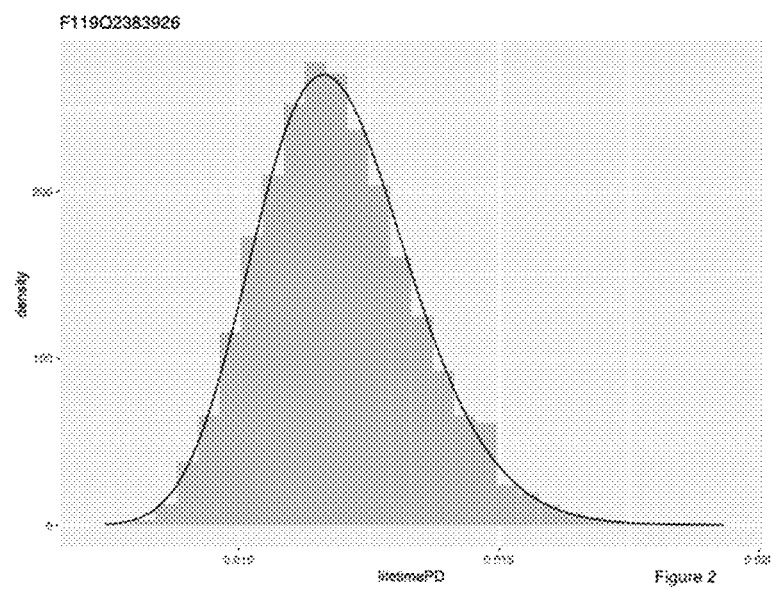
FIG. 2 shows the final distribution of lifetime probability of default for a single test account.

The Monte Carlo samples can continue for hundreds of thousands of iterations to approximate the full distribution of LPD. However, generating hundreds of thousands of iterations for a single account is far too slow to obtain a result in a few seconds as needed to provide input to loan decisioning or pricing. Instead, we run initial tests offline to determine the approximate shape of the distribution of LPD. In this example, the distribution was observed to be very close to a lognormal distribution or beta distribution, as shown in FIG. 2. In either case, it means that we need to estimate 2 or 3 parameters for the distributions. Those estimates can be done with only tens of samples, which reduces the estimation time from around ten minutes to three seconds.

Specific Example #2: Quantum Computing Solution

Every step of creating a forecast generates uncertainties. What is forecast is no more than the median of a distribution of all possible outcomes once everything is included that is unknown or only known approximately. The Monte Carlo simulation used in classical computing tabulates that distribution piece by piece. Although the approach can be effective, it is notoriously computationally expensive.

One alternative to improve the computational speed is to use quantum computing. The work of Egger et al. (2020) can be adapted to the current problem. A quantum algorithm was created to run Monte Carlo simulations, as set forth in Montanaro (2015) for estimating value-at-risk (VaR). The problem assumed a weighted sum of loss distributions for a set of assets from which a risk level such as 99.9% would be measured. In a case, with a single asset, but a set of time steps to be summed. Determining the confidence interval about this forecast is equivalent to a 95% VaR calculation.

Therefore, there is a need to design a quantum algorithm, A, that can be represented with three components. Following the notation of Egger, et. al.:

U Load the distributions UPD(t) onto N, m-qubit registers.

S Sum the registers to a lifetime P D estimate.

C Include a qubit for the condition that the value of the sum exceeds a test value x.

For operator U, the ability to load distributions efficiently into an m-qubit register is important and non-trivial. Grover's algorithm, Grover and Rudolph (2002), proves that any log-concave distribution (An (1998); Gupta and Balakrishnan (2012)) can be efficiently loaded, which includes the exponential and normal families.

Our logit-normal distributions could be loaded efficiently as normal distributions in logit space. An inverse logit-function could be applied to transform them to distributions in probability space, but the states of the qubit would no longer be uniformly spaced. That becomes a problem, because each time step t distribution would then have different measurement points.

The logit-normal distributions routinely found in models of PD can be closely approximated with lognormal distributions. Unfortunately, log-normal distributions are also not log-concave, as set forth in Asmussen and Lehtomaa (2017). The normal distribution is the only log-concave distribution that provides a reasonable approximation to the PD distributions. Because the PD distributions are not log-concave, we have a choice of inefficiently loading the quantum registers or having a mediocre approximation to the original distribution.

The quantum algorithm is defined as A=U S C. To estimate expected values such as the 95% confidence interval, a, a Quantum Amplitude Estimation (QAE) algorithm is applied Brassard et al. (2002). That approach creates a quantum operator Q(A) that accelerates the determination of an expectation value.

Previous work on creating quantum algorithms for measuring value-at-risk (VaR) have identified a quick solution for measuring a point on a distribution. In the current application, this involves creating an additional loop that estimates the probability for all outcomes less than a given value x. In our problem, x would be the confidence interval to significance, $\propto$, for measuring the uncertainty in lifetime losses or lifetime yield. A bisection search is conducted to find the smallest x such that the probability for a lifetime loss is less than oc.

The key benefit to quantum computing comes from the speed gain in the QAE algorithm for obtaining expectation values. Every application of Q(A) corresponds to one quantum sample. QAE allows us to estimate the confidence interval for cc with an estimation error that is bounded by:

$$\frac{2\sqrt{\propto (1-\propto)\pi}}{S} + \frac{\pi^2}{S^2} \sim \left(\frac{1}{S}\right)$$

where S is the number of quantum samples. When compared to the approximately (1/S) convergence rate of classical Monte Carlo methods, the speed increase is significant.

Specific Example #3: Unconditional Models

The first two examples considered the best-case approach where the models $M_D(X, E(t) \pm \Delta E(t))$ and $M_A(X, E(t) \pm \Delta E(t))$ produce forecast distributions for conditional PD and PA. Conditional means that the models predict the fraction of accounts that were active at time t−1 that will default or attrite at step t.

This problem can be simplified so that $M_D(X,E(t)\pm\Delta E(t))$ and $M_A(X,E(t)\pm\Delta E(t))$ produce unconditional forecasts, dependent only upon the number of accounts active at $t_0$. This is accomplished by making the denominator in the APC decomposition the number of accounts active at $t_0$. Having an unconditional model means that the models are directly producing the distributions for UPD(t) and UPA(t). Equations 1 & 2 are not used in this situation. Instead, LPD is the direct sum of the model forecasts.

$$LPD = \sum_{h=1}^{N} M_D(X, E(t) \pm \Delta E(t))$$

The resulting distribution still has no closed form solution, as in the previous example, so once again a quantum Monte Carlo simulation is performed. The advantage for using unconditional models is that fewer quantum registers are required, so that problem is more amenable to current hardware and runs even faster in real time.

Obviously, many modifications and variations of the present invention are possible in light of the above teachings. Thus, it is to be understood that, within the scope of the appended claims, the invention may be practiced otherwise than as specifically described above.

What is claimed and desired to be secured by a Letters Patent of the United States is:

I claim:

1. A method for estimating the uncertainty in a prediction of lifetime yield for an individual loan for given loan pricing parameters and credit risk data, the method comprising the steps of:

feeding input data into a probability of default model PD (t) and a probability of attrition model PA (t) to create PD (t) and PA (t) for each time step to the end of the loan;

prior to sampling, running test cases to determine the approximate shapes of the distribution of lifetime probability of default LPD and the distribution of yield to reduce the number of Monte Carlo simulations and thus reduce the processing time, next sampling the values of the distributions of PD (t) and PA (t) by way of Monte Carlo simulations to obtain distributions of the probabilities of unconditional default UPD (t) and unconditional attrition UPA (t) that fall within said approximate shapes in real time; and accumulating the sampling for the life of the loan to create the distribution of lifetime probability of default LPD and the distribution of yield based on the accumulated samples in real time.

2. A method for estimating the uncertainty in a prediction of lifetime yield for an individual loan for given loan pricing parameters and credit risk data, the method comprising the steps of:

feeding input data into a probability of default model PD (t) and a probability of attrition model PA (t) to create PD (t) and PA (t) for each time step to the end of the loan;

prior to sampling, running test cases to determine approximate distribution shapes of the distributions of LPD and the distribution of yield to reduce the number of Monte Carlo simulations and thus reduce the processing time, then, sampling the values of the distributions of PD (t) and PA (t) by way of a quantum Monte Carlo simulation algorithm that fall within the test distribution shapes to obtain distributions of the probabilities of unconditional default UPD (t) and unconditional attrition UPA (t);

accumulating the sampling for the life of the loan to create the distribution of lifetime probability of default LPD and the distribution of yield based on the accumulated samples.

3. The method as recited in claim 1, wherein said models of PD (t) and PA(t) are conditional models, only dependent upon the number of accounts active at $t_0$, in order to directly produce distributions for UPD(t) and UPA(t).

4. The method as recited in claim 2, wherein said models of PD (t) and PA(t) are conditional models, only dependent upon the number of accounts active at $t_0$, in order to directly produce distributions for UPD(t) and UPA(t).

5. A method for estimating the uncertainty in a prediction of lifetime yield for an individual loan for given loan pricing parameters and credit risk data, the method comprising the steps of:

feeding input data into a probability of default model PD (t) and a probability of attrition model PA (t) to create PD (t) and PA (t) for each time step to the end of the loan;

prior to sampling, approximating the shapes of the distributions of LPD and yield, then sampling the values of the distributions of PD (t) and PA (t) by way of Monte Carlo simulations that fall within the approximated distribution shapes in order to reduce the number of Monte Carlo simulations and thus reduce the processing time for a given loan in real time; and, accumulating the sampling to create the distribution of lifetime probability of default LPD and the distribution of yield that fall within the approximated distribution shapes.

6. A method for estimating the uncertainty in a prediction of lifetime yield for an individual loan for given loan pricing parameters and credit risk data, the method comprising the steps of:

feeding input data into a probability of default model PD (t) and a probability of attrition model PA (t) to create PD (t) and PA (t) for each time step to the end of the loan;

prior to sampling, approximating the distribution shapes of the distributions of LPD and yield in order to reduce the number of Monte Carlo simulations and thus reduce the processing time for a given loan to enable real time results;

sampling the values of the distributions of PD (t) and PA(t) by way of quantum Monte Carlo simulations to obtain distributions of the probabilities of conditional default UPD (t) and conditional attrition UPA (t) that fall within the distribution shapes; and accumulating the sampling to create the distribution of lifetime probability of default LPD and the distribution of yield that fall within the approximated distribution shapes.

7. The method a to obtain distributions of the probabilities of unconditional default UPD (t) and unconditional attrition UPA (t); as recited in claim 5, wherein said approximation is done off-line.

8. The method as recited in claim 6, wherein said approximation is done off-line.

* * * * *